US012610008B2

(12) United States Patent
Havemann et al.

(10) Patent No.: US 12,610,008 B2
(45) Date of Patent: Apr. 21, 2026

(54) SYSTEM, METHOD, AND COMPUTER PROGRAM FOR A SMART USER ALERT MESSAGING

(71) Applicant: Amdocs Development Limited, Limassol (CY)

(72) Inventors: Eliyah Havemann, Ra'anana (IL); Ilan Levy, Herzliya (IL); Marina Shumski Dudik, Petah Tikva (IL); Ofer Raanan, Har Adar (IL); Alexey Khait, Ra'anana (IL); Amir Lapid, Givatayim (IL); Gil Rosen, Tel Aviv (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 823 days.

(21) Appl. No.: 17/683,025

(22) Filed: Feb. 28, 2022

(65) Prior Publication Data

US 2023/0275989 A1      Aug. 31, 2023

(51) Int. Cl.
*H04M 3/42*        (2006.01)
*H04W 4/12*        (2009.01)

(52) U.S. Cl.
CPC ............... *H04M 3/42* (2013.01); *H04W 4/12* (2013.01)

(58) Field of Classification Search
CPC . H04M 3/42; H04W 4/12; G06N 3/02; G06Q 10/063; G06Q 10/10; G06Q 30/015; G06Q 30/0201; G06Q 50/60; H04L 67/535
See application file for complete search history.

(56) References Cited

U.S. PATENT DOCUMENTS 8,233,943 B1 * 7/2012 Othmer ............. H04M 1/72448
                                                         455/412.2
2021/0029559 A1    1/2021  Agarwal et al.
2022/0012630 A1    1/2022  Rosen et al.

FOREIGN PATENT DOCUMENTS

WO          2019133264 A1      7/2019

OTHER PUBLICATIONS

International Search Report and Written Opinion from PCT Application No. PCT/IB2023/051824, dated Jul. 7, 2023, 10 pages.

* cited by examiner

*Primary Examiner* — Mazda Sabouri
(74) *Attorney, Agent, or Firm* — Zilka-Kotab, P.C.

(57)          ABSTRACT
As described herein, a system, method, and computer program are provided for smart user alert messaging. In use, raw information associated with usage of a communication service by a customer is identified. Additionally, the raw information is processed, using artificial intelligence, to infer one or more aspects of a status of the customer. Further, one or more alerts is generated for the customer, based on the raw information and the one or more aspects of the status of the customer.

15 Claims, 5 Drawing Sheets

100

102 — identifying raw information associated with usage of a communication service by a customer 104 — processing the raw information, using artificial intelligence, to infer one or more aspects of a status of the customer 106 — generating one or more alerts for the customer, based on the raw information and the one or more aspects of the status of the customer

100

102    identifying raw information associated with usage of a communication service by a customer 104    processing the raw information, using artificial intelligence, to infer one or more aspects of a status of the customer 106    generating one or more alerts for the customer, based on the raw information and the one or more aspects of the status of the customer

200

300

302  collect raw data from customer premises equipment 304  generate raw information from the raw data 306  process the raw information using artificial intelligence to infer customer status 308  evaluate predefined rules based on the customer status and the raw information 310  alert(s) generated?    NO

YES 312  send alert(s) to the customer

SYSTEM, METHOD, AND COMPUTER PROGRAM FOR A SMART USER ALERT MESSAGING

FIELD OF THE INVENTION

The present invention relates to end-user messaging.

BACKGROUND

User alerts are commonly used by many applications, such as social media applications, transportation applications, device management solutions, etc. One unique challenge associated with generating user alerts is that the raw information does not include any indication itself about whether this information is valuable or interesting to the end user to any extent. Other than on social media where a user can decide (e.g. based on sender) which messages are to be pushed, alert generation mechanisms usually only take a general preference of the user (e.g. different verbosity levels) into account when deciding whether to generate an alert for the user. This technique results in unnecessary consumption of resources to generate alerts that may not be of interest to the user, and in many cases creates frustration for users, so this important notification capability is rarely used to its' full capacity.

There is thus a need for addressing these and/or other issues associated with the prior art.

SUMMARY

As described herein, a system, method, and computer program are provided for a smart user alert messaging. In use, raw information associated with usage of a communication service by a customer is identified. Additionally, the raw information is processed, using artificial intelligence, to infer one or more aspects of a status of the customer. Further, one or more alerts is generated for the customer, based on the raw information and the one or more aspects of the status of the customer.

DETAILED DESCRIPTION

Figure 1:
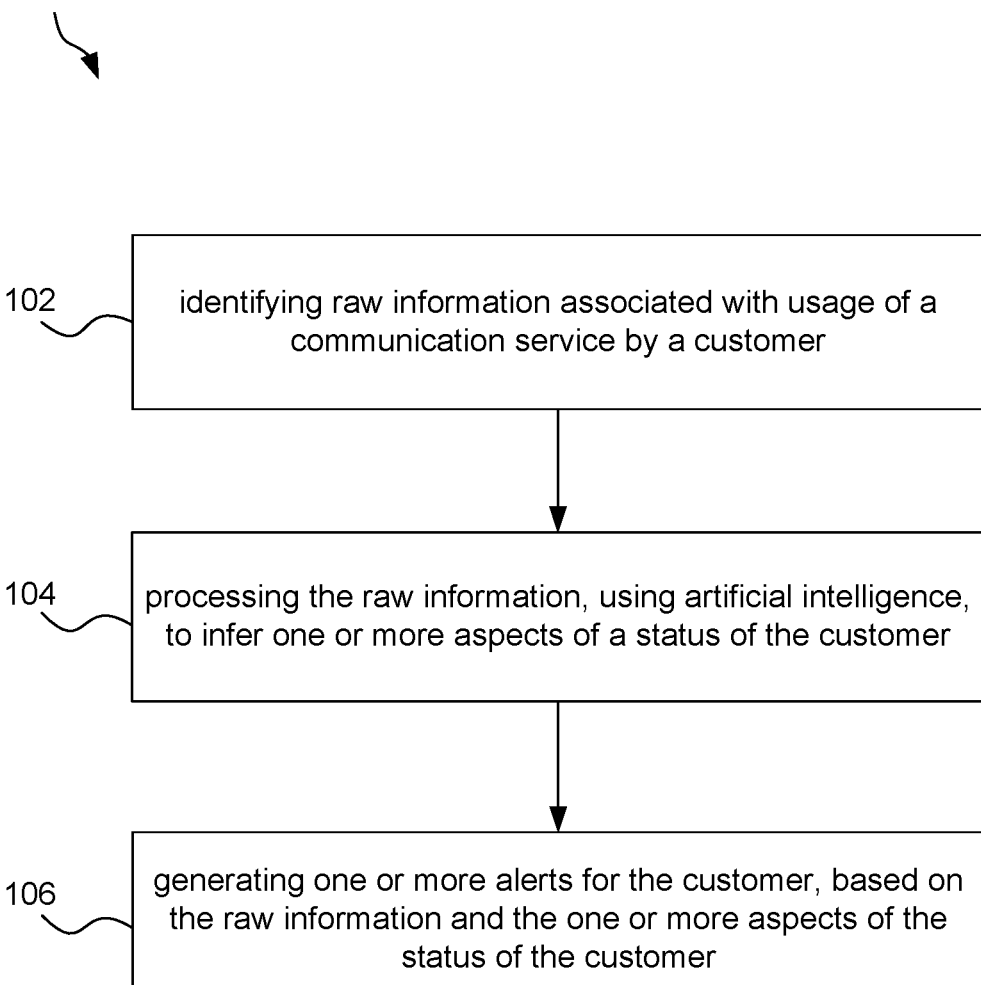
FIG. 1 illustrates a method for smart user alert messaging, in accordance with one embodiment.

FIG. 1 illustrates a method 100 for smart user alert messaging, in accordance with one embodiment. The method 100 may be performed by any computer system described below with respect to FIGS. 4 and/or 5. For example, the method 100 may be performed by a computer system of a telecommunication service provider (CSP) used for messaging alerts to its customers. In the context of the present description, the alerts may be provided by the CSP in association with usage of one or more communication services by its customers, or may be similarly provided by any third party entity employed the CSP. These services may include Internet services, mobile phone services, or any other type of communication-related service capable of being provisioned to, and used by, customers (e.g. users, subscribers, devices, etc.). Usage of these services may refer to sending/receiving messages, accessing data/webpages/applications via the Internet, etc.

In operation 102, raw information associated with usage of a communication service by a customer is identified. The raw information refers to any information generated in association with the usage of the communication network. For example, the raw information may indicate Wi-Fi coverage and connectivity of a customer premises equipment (CPE) during the usage of the communication service by the customer, metrics describing the usage of the communication service by the customer, cyber security events that occurred during the usage of the communications service by the customer, and/or parental control incidents that occurred during the usage of the communication service by the customer.

In one embodiment, the raw information may be generated from raw data which has been collected from one or more systems used to provision the communication service. The raw data may include events recorded in association with the usage of the communication service, and may indicate, for example, usage related events detected during the usage of the communication service by the customer, security related events detected during the usage of the communication service by the customer, and/or parental control events issues detected during the usage of the communication service by the customer. To this end, the raw information may be generated by processing, aggregating, etc. the raw data collected from the system(s). In some embodiments, the systems from which the raw data is collected may include a CPE, a computer system of the CSP, etc.

In operation 104, the raw information is processed, using artificial intelligence, to infer one or more aspects of a status of the customer. The status of the customer refers to any state(s) or condition(s) capable of being inferred for the customer from the raw information. Accordingly, the aspects of the status may be values inferred for the customer with regard to predetermined state(s) or condition(s).

In one embodiment, the inferred aspect may be a lifecycle of the customer with respect to the communication service. In another embodiment, the inferred aspect may be a presence of the customer in a residential space (e.g. the customer's home residence). In yet another embodiment, the inferred aspect may be an indication of whether the usage of the communication service is user-initiated or background task(s). In further embodiments, the inferred aspect may be local area network (LAN) devices online status, LAN devices type, or any other information associated with device(s) associated with the usage of the communication service.

The artificial intelligence used to process the raw information to infer the aspect(s) of the status of the customer may be a machine learning model neural network, or any other artificial intelligence mechanism configured to automatically infer (e.g. predict) the aspect(s) of the status of the customer from the raw information.

In operation 106, one or more alerts is generated for the customer, based on the raw information and the one or more aspects of the status of the customer. Alerts refer to messages to be provisioned to the customer, whether by email, text, in-app notification, webpage notification, or any other communication channel. The alerts may indicate any of the raw information associated with the usage of the communication service, such as a level of Wi-Fi coverage and connectivity of the CPE, the usage metrics, the security incidents, the parental control incidents, etc.

In one embodiment, the alert(s) may be generated based on a result of applying predefined rules to the raw information and the one or more aspects of the status of the customer. Optionally, an order may be specified for the predefined rules and the predefined rules may then be evaluated according to the order.

In an embodiment, each of the predefined rules may indicate, for a set of defined conditions, whether to generate a corresponding alert. The set of defined conditions may include at least one condition associated with at least a portion of the one or more aspects of the status of the customer. In additional embodiments, each of the predefined rules may indicate a format for the corresponding alert and/or a communication channel to be used for sending the corresponding alert to the customer.

To this end, when the one or more alerts is generated, the one or more alerts may be sent to a device of the customer (e.g. according to the specified communication channel). This method 100 of selectively generating alerts for the customer, based on customer status, may ensure that only the most relevant alerts are provided to the customer. In turn, this method 100 will reduce overall the number of alerts generated and transmitted to the customer, thereby reducing the consumption of computer/network resources required for the generation and transmission of such alerts. This method 100 may also help avoid alert fatigue on the part of the customer by reducing the overall number of alerts provided to the customer, which could otherwise occur when the customer is inundated with irrelevant alerts or too many alerts for the customer to practically review.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
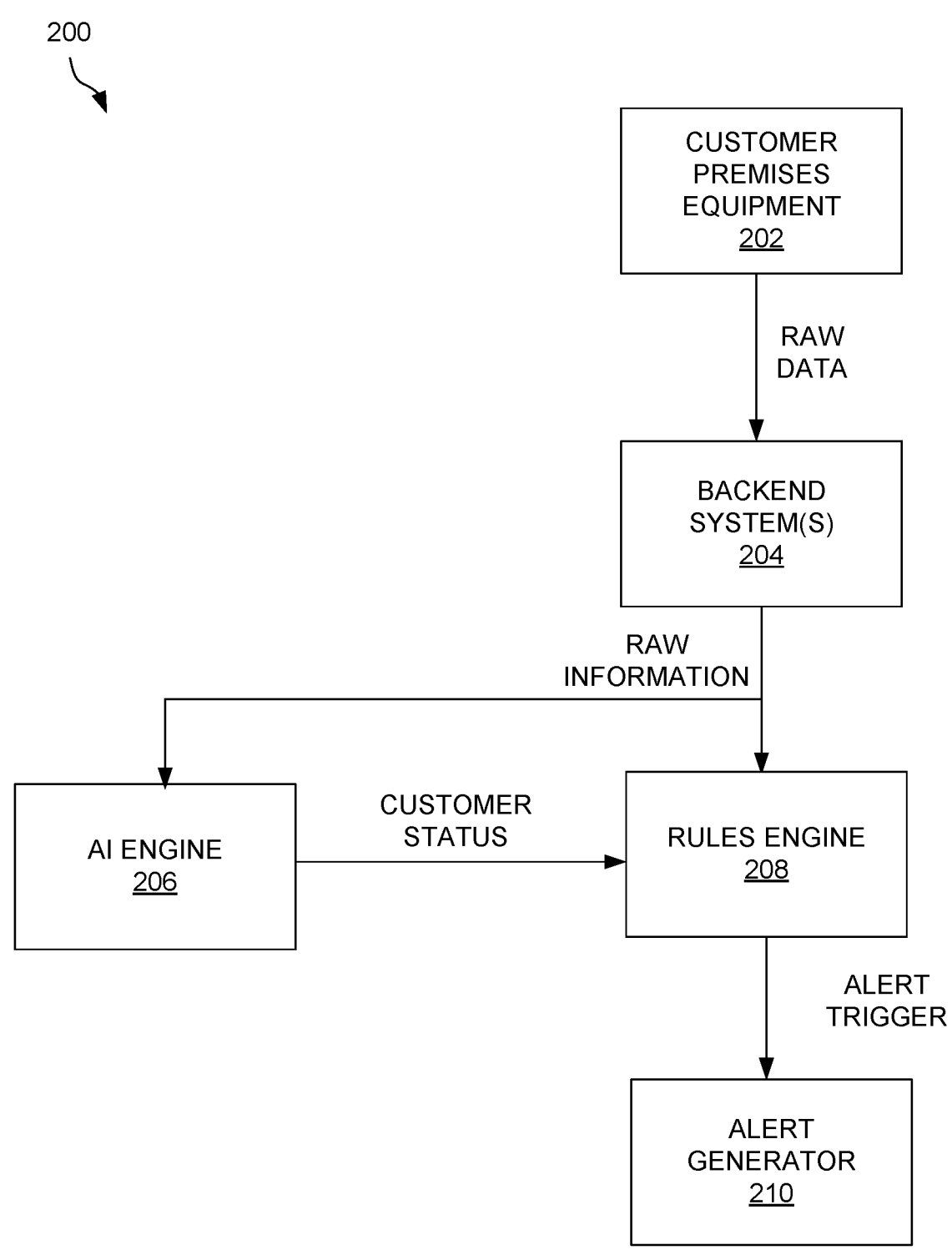
FIG. 2 illustrates a system flow diagram for smart user alert messaging, in accordance with one embodiment.

FIG. 2 illustrates a flow diagram of a system 200 for smart user alert messaging, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

Current CSP solutions use different technology to track information about what is going on in the home network of broadband customers. This information is considered "raw", even though it already was processed and put into context. Raw information is valuable for CSPs, but relaying them to customers will create a state of alarm fatigue and require deeper understanding of the subject to understand the value of the information.

The present system 200 uses contextual decisions specific to customer status to determine what information is relayed to the customer and how. This creates real value for the customer out of the raw information.

As shown, raw data is collected from a CPE 202, or multiple CPEs, by one or more backend systems 204. CPEs may be home routers, set top boxes, or any other equipment used by the customer to consume the communication service. In one embodiment, raw data from the CPE 202 is collected by a first backend 204 dealing with Wi-Fi and usage related issues and a second backend 204 dealing with Security and Parental Control issues. These systems 204 create events out of the raw data from the CPE 202 and send them as raw information to an artificial intelligence (AI) engine 206 and a rules engine 208. This data is considered "raw information" as it includes basic information already constructed from the raw data in the CPE 202. This raw information may include the following (but is not limited to):

Wi-Fi coverage and connectivity

Service usage (e.g. Streaming, Gaming, Browsing, etc.)

Security incidents (attacks on CPE, devices, originating from devices, blocked phishing attempts, blocked malware, etc.)

Parental control incidents (blocks, exceeded usage)

The AI engine 206 processes the raw information to infer one or more aspects of a status of the customer. These aspects of the status may include:

Customer lifecycle—What is the probability to churn? Is this customer a new, loyal, happy, unhappy customer? What is the user application stage?

User presence—machine learning (ML) trained AI models determine based on device usage and connectivity if a user is at home or not.

Home status—A home can be active or sleeping. AI is used to differentiate between user-initiated network activity and background tasks (e.g. software updates, etc.). If no user-initiated traffic is seen, the house is considered "sleeping."

LAN devices status—Devices can be online, offline or offnet.

LAN devices type—Fingerprinting mechanism allow to understand exactly the make and model of any device in the home network, in many cases even operating system (OS) versions.

The rules engine 208 then applies predefined rules to the inferred customer status and the raw information to determine whether to generate any alerts for the customer. In one embodiment, the rules may be configured by a CSP administrator through an administrator user interface. In another embodiment, by evaluating usage data from real customers, a default ruleset may be created. This default rule set may consist of rules to create a particular customer experience with regard to receiving alerts, which can be altered by the customer choosing a verbosity level: Quiet, Smart (default level), Pro, or Verbose (the number of "activated" rules to be evaluated for a particular customer may depend on the verbosity level selected by the customer/provider), which in turn may control how many alerts are generated for the customer.

The rules may be based on multiple filters (conditions) which can have results such as:

Set message text

Set message Uniform Resource Locator (URL)/Link

Send push notification (App)

Send short message service (SMS) message (text message)

Send email

Add to history

The rules engine 208 may include a repository of supported rules. Each rule may include: Name, Description, List of parameters with default values. Table 1 illustrates various examples of supported rules.

TABLE 1

| Name | Description | Parameters | | |
| | | Param name | Type | Default value |
|---|---|---|---|---|
| RateLimit | Defines the time frame in minutes event of same type for same device allow to be pushed | minTimeFrame | Long | 60 |
| GroupRateLimit | Rate limit events based on code or fraction of a code, independent of device | minTimeFrame eventTypePattern | Long String | 60 ".*" |
| DayOfWeek | Defines the valid days of week for sending notifications | validDays | Array | [MONDAY, TUESDAY, WEDNESDAY, THURSDAY, FRIDAY, SATURDAY, SUNDAY] |
| TimeOfDay | Defines the valid period for sending notifications | hourOfDayStartPeriod hourOfDayEndPeriod | Long Long | 5 23 |
| DelayEvent | Defines the min timeframe and threshold of events for sending notifications | minTimeFrame Threshold | Long Long | 60 3 |
| DeviceAssignment | Allow to add decision whether notification should be sent according to fact if device assigned to user and to what type of user | Type | String | HOUSEHOLD |
| DeviceClassification | Allow to add decision whether notification should be sent according to device classification | Classifications | Array | [CONSOLE, PC] |
| MobileDevice | Allow to add decision whether notification should be sent based on the fact device is mobile or not | isMobileDevice | Boolean | True |
| UserAge | Defines alternative behavior according user age | Age Operator | Long String | 18 GREATER_THAN |
| UserTracking | Defines alternative behavior according to fact whether user presence is tracked or not | isTracking | Boolean | True |

TABLE 1-continued

| | | Parameters | | |
| | | | | |
| Name | Description | Param name | Type | Default value |
| --- | --- | --- | --- | --- |
| UserAtHome | Defines alternative behavior according to user at home or not | isHome | Boolean | True |
| NotificationPackage | Allow to add condition based on site notification package | packageName | ARRAY | HIGH |
| DeviceZone | Allow to add condition based on zone the device belong too | Zone | Array | [GUEST] |
| HomeState | Allow to add condition based on whether the house is active or sleeping | HomeSleepState | Boolean | True |

Each rule may include attributes defining a set of conditions, such as:

Set of conditions (mandatory)

Each condition may have overrides for parameter's value, or the default values defined in condition repository will be used Order—default is 1, rules will be evaluated according to this order addHistory—default is false sendPush—default is false sendSMS—default is false message (optional)

url (optional)

status—default ACTIVE

Evaluation of the rules by the rules engine 208 may result in one or more alerts being triggered for the customer. The alert triggers are communicated to an alert generator 210 which generates the alerts and communicates the alerts to the customer (per the attributes of the corresponding rules that triggered the alerts).

As an option, the customer may be provided with an app to control the features of the system 200. In this embodiment, the app may be the main target for smart messaging of alerts which allows the user to stay informed about what is going on in his home network. The smart filtering capabilities in the backend allow to eliminate alarm fatigue by only sending information relevant to the specific customer.

To this end, the system 200 may use AI to determine user status and change messaging accordingly, may dynamically adopt the messaging based on behavior in the user's home, and may change a messaging format and transport based on contextual information (e.g. coming from different 3rd parties).

In particular, for customers with average technical knowledge, running a (home) network with many Internet of Things (IoT) and other devices is a challenge. The smart filtering system 200 allows a rule and AI based backend to make smart decisions on if and with what wording, language, format, or channel (App notification, SMS, email, chat, etc.) technical information about events in the network are communicated to the customer.

The system 200 takes many factors into consideration, including assumptions about the status of the customer based on AI calculation (e.g. churn probability, user presence and others) and status of devices, device fingerprint, device usage, service usage, age, customer preference and many more to make a detailed decision to match the customer's need for information without creating alarm fatigue.

Figure 3:
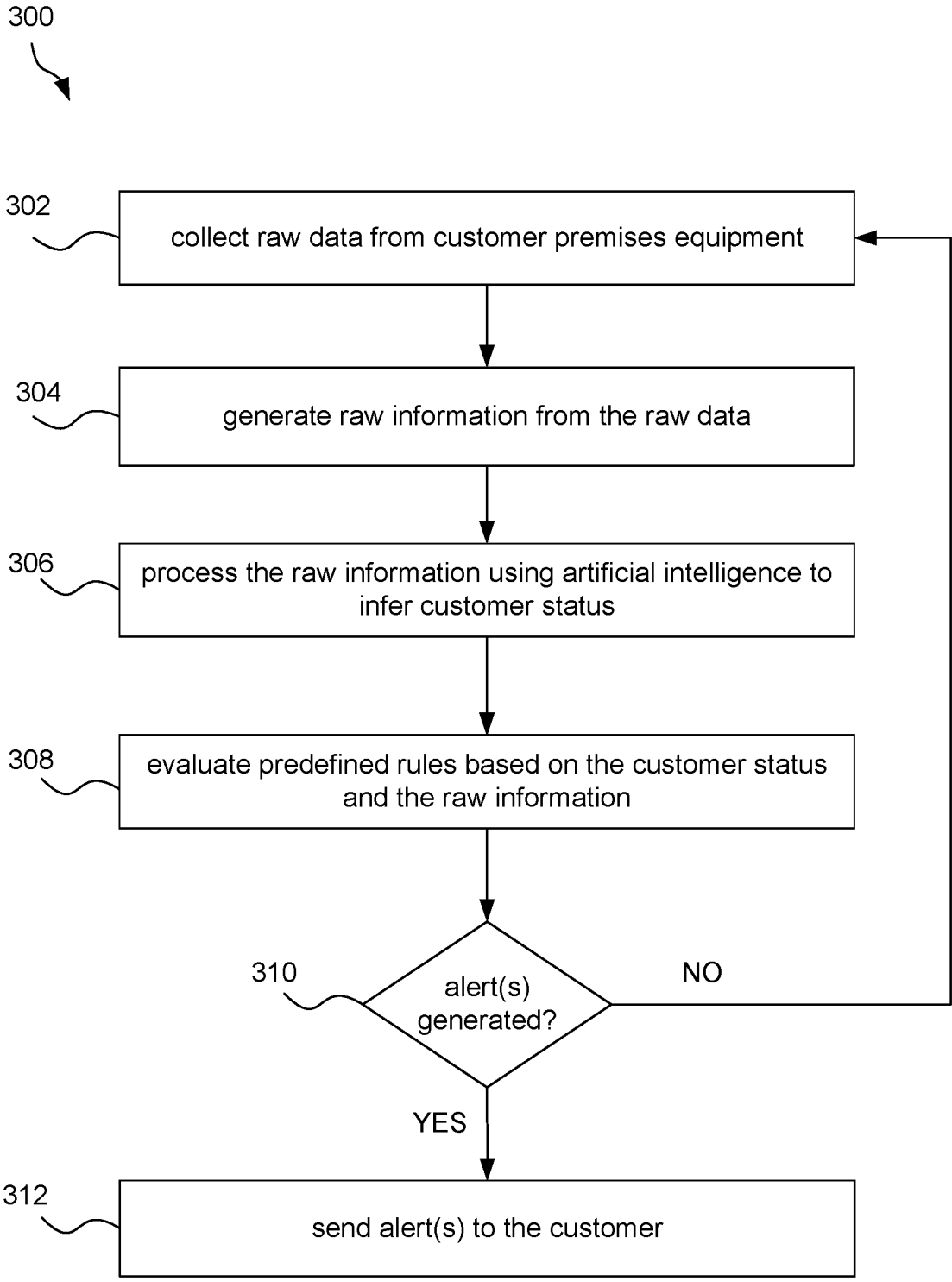
FIG. 3 illustrates a method for using rules and inferred customer status to provide smart user alert messaging, in accordance with one embodiment.

FIG. 3 illustrates a method 300 for using rules and inferred customer status to provide smart user alert messaging, in accordance with one embodiment. As an option, the method 300 may be carried out in the context of the details of the previous figure and/or any subsequent figure(s). For example, the method 300 may be carried out using the system 200 of FIG. 2. Of course, however, the method 300 may be carried out in the context of any desired environment. Further, the aforementioned definitions may equally apply to the description below.

In operation 302, raw data from CPE is collected. In operation 304, raw information is generated from the raw data. For example, the raw data is processed, transformed, etc. to create the raw information.

In operation 306, the raw information is processed using artificial intelligence to infer customer status. In operation 308, predefined rules are evaluated based on the customer status and the raw information. In decision 310, it is determined whether any alerts have been generated as a result of the evaluation in operation 308.

When it is determined in decision 310 that no alerts have been generated, the method 300 returns to operation 302 where additional raw data (for a subsequent time period) is collected. When it is determined in decision 310 that one or more alerts have been generated, the alerts are sent to the customer, as shown in operation 312.

Figure 4:
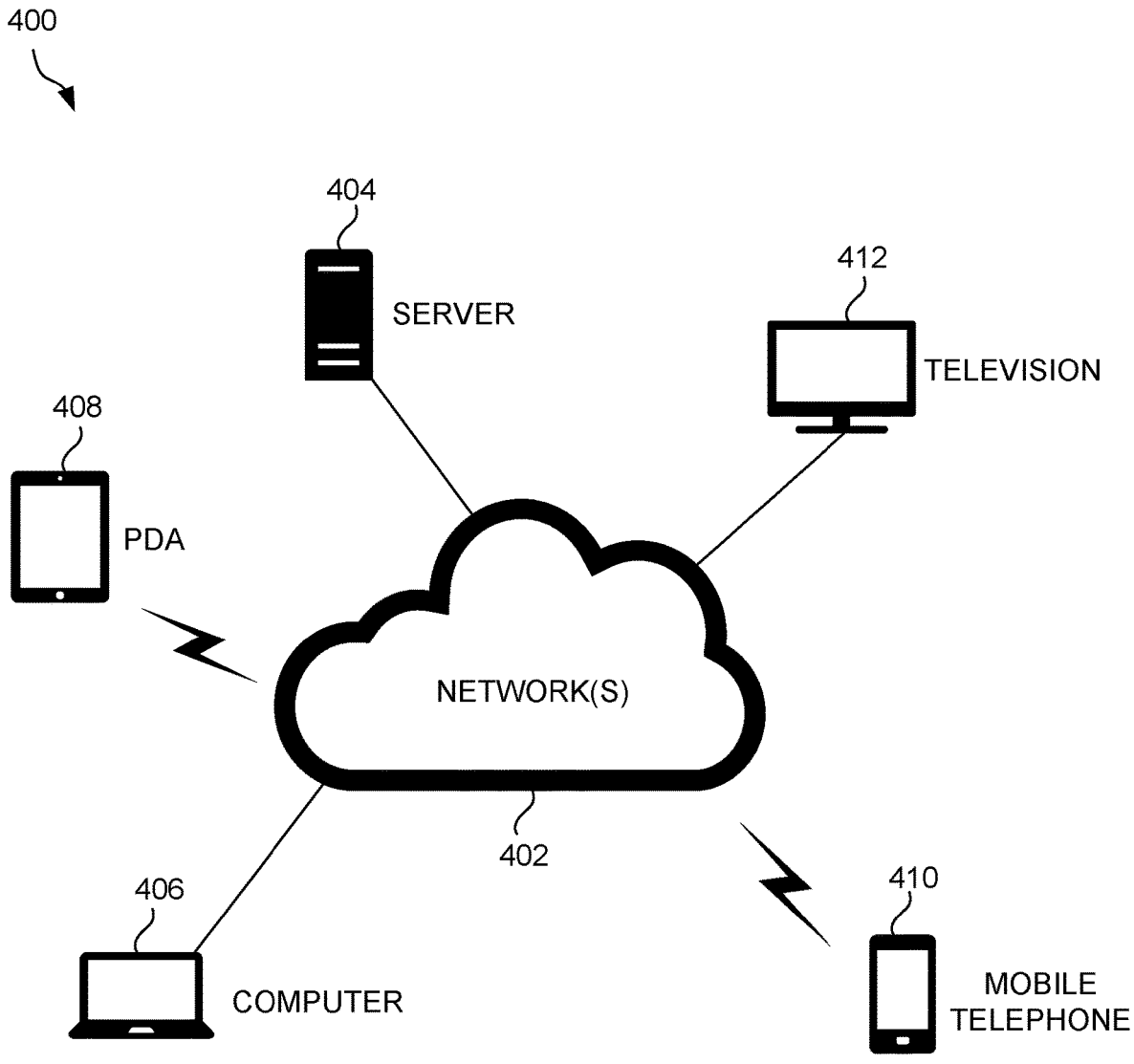
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
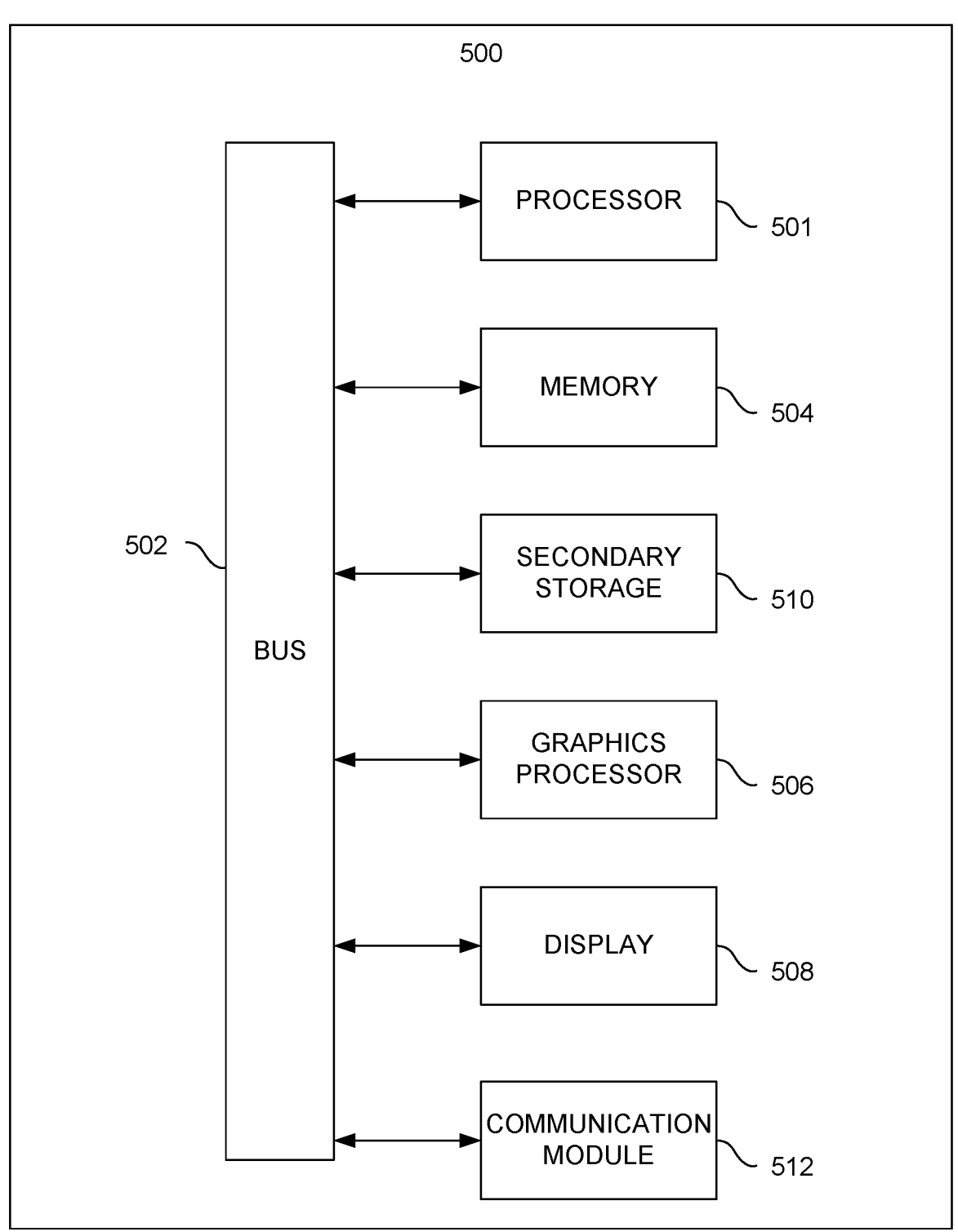
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

identify, by a backend system from a customer premises equipment (CPE) located in a residence of a customer, raw information associated with usage of a communication service by the customer, the raw information indicating at least an event that occurred in association with the usage of the communication service by the customer;

process, by the backend system, the raw information, using artificial intelligence, to infer a status of the customer including an indication of whether the customer is present in the residence;

identify, by the backend system, a selection made by the customer specifying a number of rules included in a plurality of predefined rules that are to be considered active rules for being evaluated with respect to the raw information and the status of the customer, wherein each of the rules in the plurality of predefined rules includes conditions for sending an alert to the customer, the conditions include at least an event type and a customer status;

evaluate, by the backend system, only the active rules based on the raw information and the status of the customer, to determine whether to alert the customer about the event; and conditionally alert the customer about the event, by the backend system, based on a result of the determination.

2. The non-transitory computer-readable media of claim 1, wherein the raw data collected from the customer premises equipment indicates:

usage related events detected during the usage of the communication service by the customer, security related events detected during the usage of the communication service by the customer, and parental control events issues detected during the usage of the communication service by the customer.

3. The non-transitory computer-readable media of claim 1, wherein the status of the customer further indicates:

a lifecycle of the customer with respect to the communication service.

4. The non-transitory computer-readable media of claim 1, wherein the status of the customer further indicates:

an indication of whether the usage of the communication service is user-initiated.

5. The non-transitory computer-readable media of claim 1, wherein the status of the customer further indicates:

an indication of whether the usage of the communication service is background tasks.

6. The non-transitory computer-readable media of claim 1, wherein the status of the customer further indicates:

local area network (LAN) devices online status.

7. The non-transitory computer-readable media of claim 1, wherein the status of the customer further indicates:

LAN devices type.

8. The non-transitory computer-readable media of claim 1, wherein each of the predefined rules indicates, for a set of defined conditions, whether to generate a corresponding alert.

9. The non-transitory computer-readable media of claim 8, wherein each of the predefined rules indicates a format for the corresponding alert.

10. The non-transitory computer-readable media of claim 8, wherein each of the predefined rules indicates a communication channel to be used for sending the corresponding alert to the customer.

11. The non-transitory computer-readable media of claim 1, wherein an order is specified for the predefined rules and wherein the predefined rules are evaluated according to the order.

12. A method, comprising:

at a computer system:

identifying, by a backend system from a customer premises equipment (CPE) located in a residence of a customer, raw information associated with usage of a communication service by the customer, the raw information indicating at least an event that occurred in association with the usage of the communication service by the customer;

processing, by the backend system, the raw information, using artificial intelligence, to infer a status of the customer including an indication of whether the customer is present in the residence;

identifying, by the backend system, a selection made by the customer specifying a number of rules included in a plurality of predefined rules that are to be considered active rules for being evaluated with respect to the raw information and the status of the customer, wherein each of the rules in the plurality of predefined rules includes conditions for sending an alert to the customer, the conditions include at least an event type and a customer status;

evaluating, by the backend system, only the active rules based on the raw information and the status of the customer, to determine whether to alert the customer about the event; and conditionally alerting the customer about the event, by the backend system, based on a result of the determination.

13. A system, comprising:

a non-transitory memory storing instructions; and one or more processors in communication with the non-transitory memory that execute the instructions to:

identify, by a backend system from a customer premises equipment (CPE) located in a residence of a customer, raw information associated with usage of a communication service by the customer, the raw information indicating at least an event that occurred in association with the usage of the communication service by the customer;

process, by the backend system, the raw information, using artificial intelligence, to infer a status of the customer including an indication of whether the customer is present in the residence;

identify, by the backend system, a selection made by the customer specifying a number of rules included in a plurality of predefined rules that are to be considered active rules for being evaluated with respect to the raw information and the status of the customer, wherein each of the rules in the plurality of predefined rules includes conditions for sending an alert to the customer, the conditions include at least an event type and a customer status;

evaluate, by the backend system, only the active rules based on the raw information and the status of the customer, to determine whether to alert the customer about the event; and conditionally alert the customer about the event, by the backend system, based on a result of the determination.

14. The non-transitory computer-readable media of claim 1, wherein conditionally alerting the customer about the event, based on a result of the determination, includes:

alerting the customer about the event when the result of the determination is to alert the customer, and preventing alerting of the customer about the event when the result of the determination is to not to alert the customer.

15. The non-transitory computer-readable media of claim 14, wherein a messaging that is defined by the one or more rules is used when alerting the customer.

* * * * *